United States Patent [19]

Marchiano

[11] Patent Number: 4,559,962

[45] Date of Patent: Dec. 24, 1985

[54] AUXILIARY MOBILITY GUIDE FOR A CANE

[76] Inventor: John Marchiano, 23 Spring St., Tremont, Pa. 17981

[21] Appl. No.: 694,030

[22] Filed: Jan. 23, 1985

[51] Int. Cl.⁴ .......................... A61H 3/02; B60B 33/00

[52] U.S. Cl. ............................. 135/85; 135/DIG. 11; 16/30

[58] Field of Search ............... 135/DIG. 11, DIG. 10, 135/DIG. 9, 85, 77, 72, 76; 16/18 R, 45, 46, 47, 48, 29, 30, 32, 37, 38, 39, 31 R, 31 A, 42 R, 42 T, 43

[56] References Cited

U.S. PATENT DOCUMENTS

| | | | |
|---|---|---|---|
| 225,335 | 3/1880 | Brinton | 16/18 |
| 317,230 | 5/1885 | Smith | 16/29 X |
| 1,017,799 | 2/1912 | Read | 16/30 |
| 1,063,727 | 6/1913 | Pierce | 16/39 |
| 1,512,353 | 10/1924 | Marcus | 16/29 |
| 1,542,894 | 6/1925 | Langner | 135/DIG. 11 X |
| 2,103,202 | 12/1937 | Green | 16/42 R X |
| 2,522,032 | 9/1950 | Gerry | 16/38 X |
| 3,158,851 | 11/1964 | Ruthven | 135/DIG. 11 X |

FOREIGN PATENT DOCUMENTS

| | | | |
|---|---|---|---|
| 116977 | 5/1943 | Australia | 135/DIG. 10 |
| 857145 | 12/1970 | Canada | 16/30 |
| 907661 | 7/1945 | France | 135/85 |
| 1189620 | 3/1959 | France | 135/85 |
| 2359603 | 3/1978 | France | 135/85 |
| 506083 | 12/1954 | Italy | 135/85 |

*Primary Examiner*—Robert A. Hafer
*Assistant Examiner*—Arnold W. Kramer
*Attorney, Agent, or Firm*—Ruth Moyerman

[57] ABSTRACT

An auxiliary mobility guide adapted to be mounted on the tip end of a cane for a sightloss person is disclosed. The mobility guide includes a frame with at least one C bracket, each C bracket having two horizontal legs connected by a vertical leg. An arm projects upwardly from the top of the vertical leg, thereby forming an inclined plane approximately equal to that plane at which sightloss users place a guide cane with respect to the ground. A bracket mounted on the arm's upper side is adapted to adjustably overfit the tip end of a cane. One freely swiveling and rollable wheel assembly is adapted to be received and retained by each C bracket. The assembly's wheel fits freely below the frame's lower horizontal leg. When the mobility guide is mounted on the tip end of a cane, the swiveling and rolling of the wheel upon the ground surface as the user walks using the guide will send tactile responses through the guide to the cane and to the hand of the cane's user at the same cane-to-ground angle as when the cane is used alone.

6 Claims, 4 Drawing Figures

AUXILIARY MOBILITY GUIDE FOR A CANE

BACKGROUND OF THE INVENTION

1. Field of the Invention

This invention relates to a cane for sightloss persons, and more particularly to an auxiliary mobility guide adapted to be mounted on the tip end of a cane.

2. Description of the Prior Art

Sightloss persons using a bare tipped cane are instructed to use them by the "cane scanning" method. While this is the generally accepted method and is usually successful over normal terrain, the scanning method causes the user particular difficulties on soft, rough or uneven surfaces. On such surfaces, the cane tends to stick, causing an unpleasant jarring effect to the user.

Such bare tipped prior art devices do not work on the aforementioned terrains which are found on grassy lawn-type areas, woodland paths, unpathed walking areas, rough uneven sidewalk areas, etc. and therefore call for additional use of a guide dog or sighted guide person. The cost and availability of such added mobility means makes everyday navigation an added concern to the sightloss cane user. The user's independence is therefore limited to the terrain traveled or the availability of improved guide means.

There is therefore a great need for an auxiliary guide that can be adapted for use on the normal scanning cane of a sightloss person, thereby increasing his independence and range of travel without the added expense and care of a guide dog or availability of a sighted guide person.

SUMMARY OF THE INVENTION

The aforementioned prior art problems are overcome by the auxiliary mobility guide of this invention. The mobility guide is adapted to be mounted on the tip end of a cane for sightloss persons and includes a frame with at least one C bracket. Each C bracket has, as part of the C, two horizontal legs connected by a vertical leg. An arm projects upwardly from the top of the vertical leg, sloping away from the upper horizontal leg. The leg thereby forms an inclined plane approximately equal to that plane at which sightloss users place a guide cane with respect to the ground. A bracket mounted on the arm's upper side is adapted to adjustably overfit the tip end of a cane.

One freely swiveling and rotatable wheel assembly is adapted to be received and retained by each C bracket. The assembly's wheel fits freely below the frame's lower horizontal leg. When the mobility guide is mounted on the tip end of a cane, the swiveling and rolling of the wheel upon the ground surface as the user walks using the guide will send tactile responses through the guide to the cane, and to the hand of the cane's user at the same cane-to-ground angle as when the cane is used alone.

An alternate embodiment includes two wheel assemblies joined together by an intersecting plate. The plate is joined to the upwardly projecting arm by an intersecting leg.

It is therefore an object of this invention to provide a device that is compatible in use with the stock bare-tipped cane.

It is another object of this invention to provide a device that would be used in the generally taught and accepted manner as "cane scanning".

It is a further object of this invention to provide a device that would prevent sticking of the cane tip, thereby eliminating the subsequent jarring effect to the cane's user.

It is yet another object of this invention to provide an auxiliary mobility guide that may be either permanently or removably attached to the cane of a sightloss person.

It is still another object of this invention to provide a device that provides a sightloss cane user with greater independence and less need for a guide dog or sighted guide person.

It is still a further object of this invention to provide a device that enables a sightloss cane user additional mobility without great added expense.

These and other objects will be more readily ascertainable to one skilled in the art from a consideration of the following Figures and exemplary embodiments.

BRIEF DESCRIPTION OF THE DRAWING(S)

DETAILED DESCRIPTION OF THE PREFERRED EMBODIMENT(S)

Figure 1:
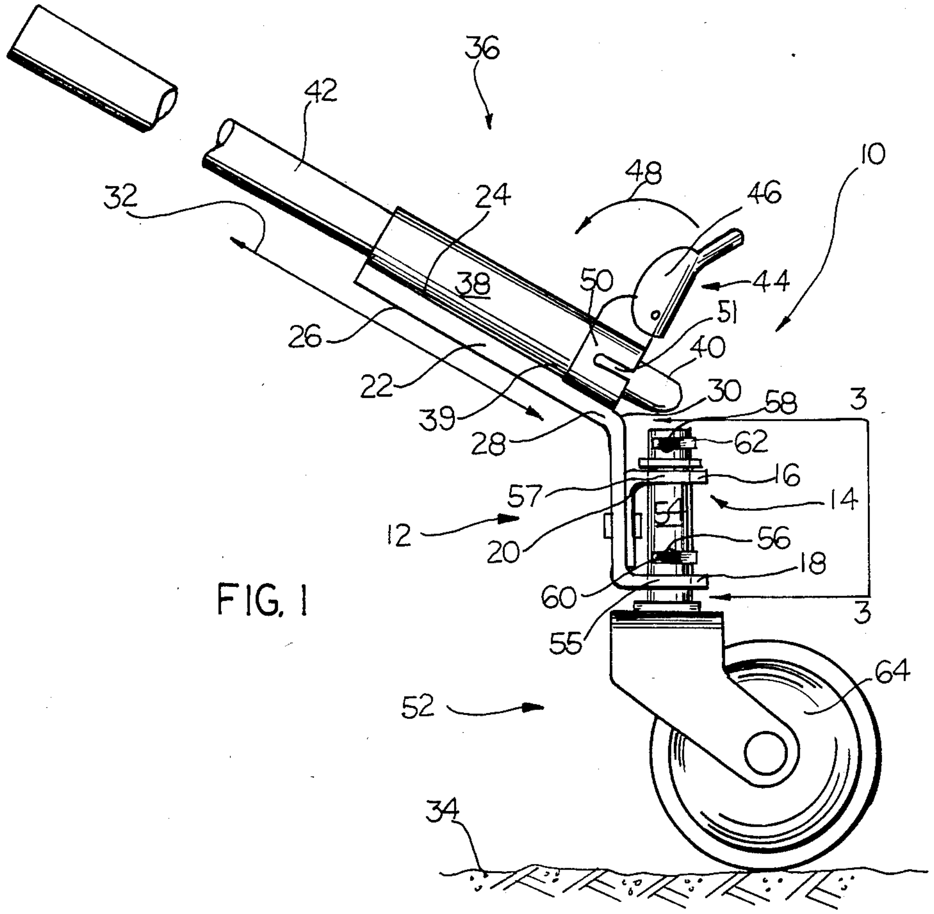
FIG. 1 is a side view of the preferred embodiment of the device of this invention showing the auxiliary mobility guide mounted on a fragmented cane for sight loss persons.

Referring now to the drawings, and more particularly to FIG. 1, frame 12 of device 10 is shown to include C-shaped bracket 14 having upper horizontal leg 16 and lower horizontal leg 18 connected by vertical leg 20. Arm 22 of frame 12 has upper side 24 and lower side 26. Arm 22 is attached at arm 22's end 28 to vertical leg 20 at vertical leg's top 30.

Arm 22 projects upwardly, sloping away from upper horizontal leg 16, thereby forming an inclined plane, as indicated by arrow 32, approximately equal to that plane at which sight loss users place a guide cane with respect to ground 34.

Mounting bracket 36 is mounted on arm 22 at upper side 24 of arm 22. Mounting bracket 36 includes sleeve 38 which overfits tip end 40 of cane 42 and is secured to cane 42 by toggle collar clamp 44 shown overfitting sleeve 38 at sleeve end 39. In this view, collar toggle clamp 44 has not been activated. Toggle collar clamp 44 can be activated by the depression of lever 46 in the direction of arrow 48, thereby causing the compression of collar 50 through slits 51 to grasp and hold tip end 40 of cane 42.

Wheel assembly 52 is adapted to be received and retained within frame 12's C bracket 14. Wheel assembly 52 includes castor shaft 54 that is at least longer than C bracket 14. Shaft 54 includes lower aperture 56 and upper aperture 58 spaced apart so that when shaft 54 projects through horizontal leg apertures (shown in phantom and indicated at 55 and 57) of C bracket 14, lower aperture 56 and upper aperture 58 of shaft 54 each reach respectively above each of their corresponding horizontal leg apertures 55 and 57 (more clearly shown in FIGS. 2 and 3).

Stop means as indicated by cotter pin 60 and 62, one each inserted into corresponding lower aperture 56 and corresponding upper aperture 58 of shaft 54, serve to retain shaft 54 within corresponding horizontal legs 18 and 16 of C bracket 14.

Freely swiveling, rollable wheel 64 of wheel assembly 52 fits freely below lower horizontal leg 18 of frame 12 whereby when mobility guide 10 is mounted on tip end 40 of cane 42, swiveling and rolling of wheel 64 upon ground surface 34 as the user walks using guide 10 will send tactile responses through guide 10 to cane 42 and to the hand of cane 42's user at the same cane-to-ground angle as when cane 42 is used alone.

Figure 2:
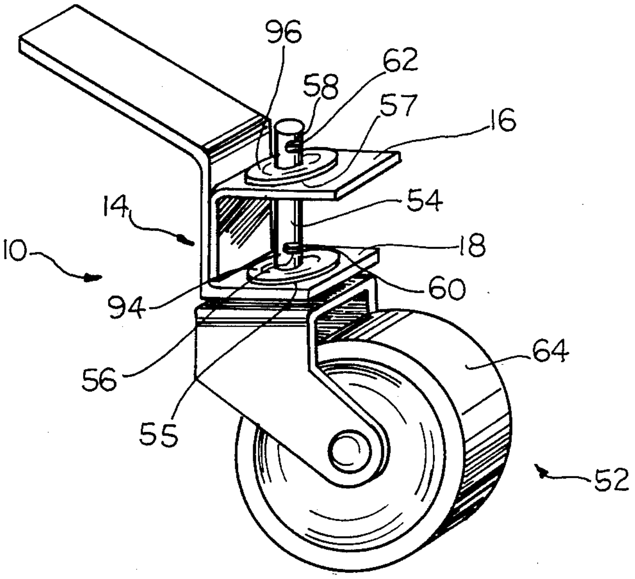
FIG. 2 is an oblique isometric view of the preferred embodiment of the device of this invention with the cane and mounting bracket omitted.

Referring now to FIG. 2, an oblique isometric view of preferred embodiment 10 is shown with the cane and mounting bracket omitted. Wheel assembly 52 includes castor shaft 54 that is at least longer than C bracket 14. Shaft 54 includes lower aperture 56 and upper aperture 58 spaced apart so that when shaft 54 projects through horizontal leg apertures as indicated at 55 and 57 of C bracket 14; lower aperture 56 of shaft 54 fits above lower horizontal leg 18 of C bracket 14 and upper aperture 58 of shaft 54 fits above upper horizontal leg 16 of C bracket 14.

Shaft 54 is retained within C bracket 14 by cotter pins 60 and 62, fitting into corresponding shaft apertures 56 and 58. Metal washer 94 fits below cotter pin 60 and metal washer 96 fits below cotter pin 62. Metal washers 94 and 96 serve to lessen the wear of corresponding horizontal legs 18 and 16 as freely swiveling, rollable wheel 64 of wheel assembly 52 moves while in use.

Figure 3:
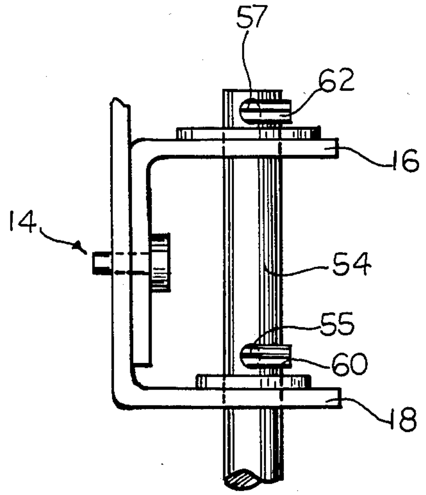
FIG. 3 shows a sectional enlargement taken along lines 3—3 of FIG. 1 which more clearly shows the stop means.

Referring now to FIG. 3, a sectional enlargement taken along lines 3—3 of FIG. 1, more clearly shows cotter pins 60 and 62 fitting into corresponding apertures 55 and 57 as stop means by which shaft 54 is retained within horizontal legs 18 and 16 of C bracket 14.

Figure 4:
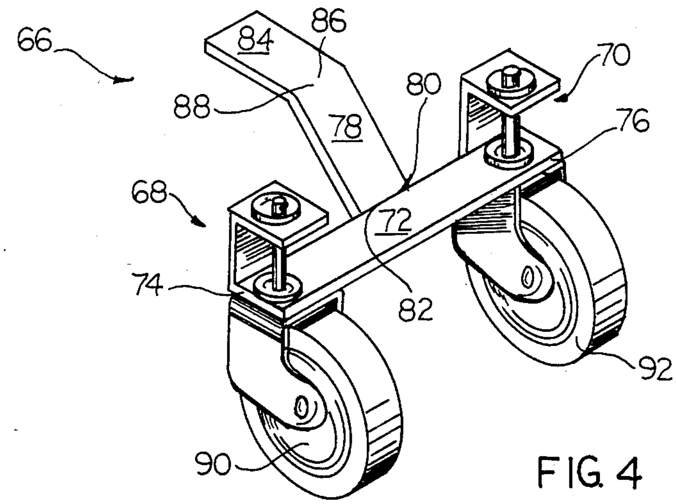
FIG. 4 is an oblique isometric view of an alternate embodiment of this invention.

Referring now to FIG. 4, an oblique isometric view of alternate embodiment 66 is shown to include two C-shaped brackets 68 and 70. C-shaped brackets 68 and 70 are joined to each other by intersecting plate 72 which is connected to and in the same plane as lower horizontal leg 74 of C bracket 68 and lower horizontal leg 76 of C bracket 70. Intersecting leg 78 is connected at its bottom 80 to plate 72 approximate center 82 of plate 72. Arm 84 is attached at its end 86 to top end 88 of intersecting leg 78.

Arm 84 projects upwardly, sloping away from lower horizontal legs 74 and 76, thereby forming an inclined plane approximately equal to that plane at which sight loss users place a guide cane with respect to the ground (shown in FIG 1).

Alternate embodiment 66 also includes freely swiveling, rollable wheels 90 and 92, each of which fits freely below their corresponding lower horizontal legs 74 and 76 whereby when mobility guide 66 is mounted on the tip end of a cane, the swiveling and rolling of wheels 90 and 92 upon the ground surface as the user walks using guide 66 will send tactile responses through guide 66 to the cane and to the hand of the cane's user at the same cane-to-ground angle as when the cane is used alone.

There are many variations which may be practiced within the scope of this invention. For example, the frame may be of any configuration so long as there is at least one freely swiveling, rollable wheel with unobstructed access to the ground and still be within the scope of this invention.

Likewise, the mounting means may be accomplished in any manner as long as the cane-to-ground angle remains the same as when the cane is used alone and still be within the scope of this invention. The inside diameter of the mounting means can be varied to correspond with numerous cane types.

Furthermore, the wheel assembly may be of any configuration so long as the wheel is set to be freely swiveling and rollable and still be within the scope of this invention.

Also, the stop means to hold the wheel in place may be of any variety and type, and still be within the scope of this invention.

The fitting of the washer below the cotter pins is merely an added advantage to reduce wear and is not critical to the scope of the invention.

The device of this invention has many advantages. Chiefly among these is that the device can be adapted for use on the normal scanning cane of a sight loss person, thereby increasing his independence and range of travel without the added expense and care of a guide dog or availability of a sighted guide person.

Secondly, the device can be used in the generally taught and accepted manner of "cane scanning" which is generally taught at most institutions serving and instructing sight loss persons in cane use and function.

Thirdly, the device prevents sticking of the cane's tip, thereby eliminating the subsequent jarring effect to the cane's user.

Fourthly, the device may be permanently or removably mounted on a cane for sight loss persons.

The alternate embodiment including two wheel assemblies provides more stability for the sight loss cane user who may be too weak in the wrist area to hold their cane upright.

Finally, the device of this invention is compatible in use with the stock bare-tipped cane.

Having now illustrated and described my invention, it is not intended that such description limit this invention, but rather that this invention be limited only by a reasonable interpretation of the appended claims.

What is claimed is:

1. An auxiliary mobility guide adapted to be mounted on a cane for sightloss persons comprising:

(a) a frame including at least one C-shaped bracket, said bracket having an upper horizontal leg and a lower horizontal leg connected by a vertical leg, an arm including an upper and lower side, said arm attached at its one end to the top of said vertical leg, said arm projecting upwardly sloping away from said upper horizontal leg, thereby forming an inclined plane approximately equal to that plane at which sightloss users place a guide cane with respect to the ground;

(b) a bracket mounted on said arm's upper side adapted to adjustably overfit the tip end of said cane;

(c) one freely swiveling, rollable wheel assembly for each said C bracket, said assembly adapted to be received by and retained within each of said frame's C brackets, said assembly's wheel fitting freely below said frame's lower horizontal leg, whereby when said mobility guide is mounted on said tip end of said cane, said swiveling and rolling of said wheel upon the ground surface as the user walks using said guide will send tactile responses through said guide to said cane and to the hand of said cane's user at the same cane-to-ground angle as when said cane is used alone.

2. The mobility guide according to claim 1 wherein said mounting bracket of part (b) includes a toggle activated collar clamp overfitting a sleeve.

3. The mobility guide according to claim 1 wherein said horizontal legs of part (a) each include approximate a centrally aligned aperture to receive a castor shaft and wherein said wheel assembly of part (c) includes a caster with a shaft at least longer than said C bracket, said shaft including lower and upper apertures spaced apart so that when said shaft projects through said C bracket's horizontal leg apertures, said shaft apertures reach above each of said C brackets horizontal legs to receive stop means to hold said shaft in place.

4. The mobility guide according to claim 3 wherein said stop means includes two cotter pins, one each inserted in each of said shaft's apertures.

5. The mobility guide according to claim 4 wherein said stop means also includes two washers, one each inserted on said shaft below each of said cotter pins.

6. An auxiliary mobility guide adapted to be mounted on a cane for sightloss persons comprising:

(a) a frame including two C-shaped brackets, said C-shaped brackets each having an upper horizontal leg and a lower horizontal leg connected by a vertical leg, said C-shaped brackets joined to each other by a plate;

(b) an intersecting leg connected at its bottom to said plate approximate said plate's center;

(c) an arm attached at its one end to said top of said intersecting leg, said arm projecting upwardly sloping away from the common plane of said upper horizontal legs, to form an inclined plane approximately equal to that plane at which sightloss users place a guide cane with respect to the ground;

(d) means to mount said arm to a cane; and, (e) two freely swiveling, rollable wheel assemblies, one for each respective C bracket, each assembly adapted to be received by and retained within one of said frame's C brackets, said assembly's wheel fitting freely below said frame's lower horizontal leg.

* * * * *